United States Patent
Paul et al.

(10) Patent No.: US 10,619,726 B2
(45) Date of Patent: Apr. 14, 2020

(54) HYDRAULIC SYSTEM OF AN AUTOMATIC GEARBOX

(71) Applicant: ZF Friedrichshafen AG, Friedrichshafen (DE)

(72) Inventors: Alexander Paul, Oberteuringen (DE); Bernd Lutz, Uhldingen-Mühlhofen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 83 days.

(21) Appl. No.: 15/751,888

(22) PCT Filed: Jul. 22, 2016

(86) PCT No.: PCT/EP2016/067515
§ 371 (c)(1),
(2) Date: Feb. 12, 2018

(87) PCT Pub. No.: WO2017/029069
PCT Pub. Date: Feb. 23, 2017

(65) Prior Publication Data
US 2018/0274667 A1    Sep. 27, 2018

(30) Foreign Application Priority Data

Aug. 20, 2015   (DE) .................... 10 2015 215 930

(51) Int. Cl.
*F16H 61/00* (2006.01)
*F16H 61/02* (2006.01)

(52) U.S. Cl.
CPC ..... *F16H 61/0025* (2013.01); *F16H 61/0206* (2013.01); *B60Y 2300/18016* (2013.01); *F16H 2061/0034* (2013.01); *F16H 2312/14* (2013.01)

(58) Field of Classification Search
CPC ............ F16H 61/0025; F16H 61/0206; B60Y 2300/18016
(Continued)

(56) References Cited

U.S. PATENT DOCUMENTS

| | | |
|---|---|---|
| 6,093,974 A | 7/2000 | Tabata et al. |
| 8,639,424 B2 | 1/2014 | Lundberg et al. |

(Continued)

FOREIGN PATENT DOCUMENTS

| | | |
|---|---|---|
| DE | 103 18 152 A1 | 11/2004 |
| DE | 699 19 925 T2 | 9/2005 |

(Continued)

OTHER PUBLICATIONS

Machine Translation of DE102007003924 (reference provided by Applicant).*

(Continued)

*Primary Examiner* — Michael Leslie
*Assistant Examiner* — Daniel S Collins
(74) *Attorney, Agent, or Firm* — Davis & Bujold, P.L.L.C.; Michael J. Bujold

(57) ABSTRACT

A hydraulic system (1) of an automatic transmission of a motor vehicle includes a hydraulic pump (2) powered by a drive engine for supplying pressure to the hydraulic system (1). A hydraulic reservoir (10) by which, when the drive engine is at rest, a pressure drop in a main pressure circuit (7) of the hydraulic system (1) can at least be delayed. The hydraulic reservoir (10) is connected to the main pressure circuit (7) by way of an orifice (14) or a throttle.

10 Claims, 1 Drawing Sheet

(58) Field of Classification Search
USPC .......................................................... 60/413
See application file for complete search history.

(56) References Cited

U.S. PATENT DOCUMENTS

| | | |
|---|---|---|
| 9,097,336 B2 | 8/2015 | Block et al. |
| 2009/0143193 A1 | 6/2009 | Ohshima et al. |
| 2013/0116898 A1 | 5/2013 | Lundberg et al. |
| 2013/0263948 A1 | 10/2013 | Block et al. |

FOREIGN PATENT DOCUMENTS

| | | |
|---|---|---|
| DE | 10 2007 003 924 A1 | 7/2008 |
| DE | 10 2010 042 189 A1 | 4/2012 |
| DE | 10 2010 042 194 A1 | 4/2012 |
| DE | 10 2012 219 832 A1 | 5/2013 |
| EP | 0 950 557 A2 | 10/1999 |

OTHER PUBLICATIONS

German Search Report Corresponding to 10 2015 215 930.2 dated May 25, 2016.
International Search Report Corresponding to PCT/EP2016/067515 dated Oct. 14, 2016.
Written Opinion Corresponding to PCT/EP2016/067515 dated Oct. 14, 2016.

\* cited by examiner

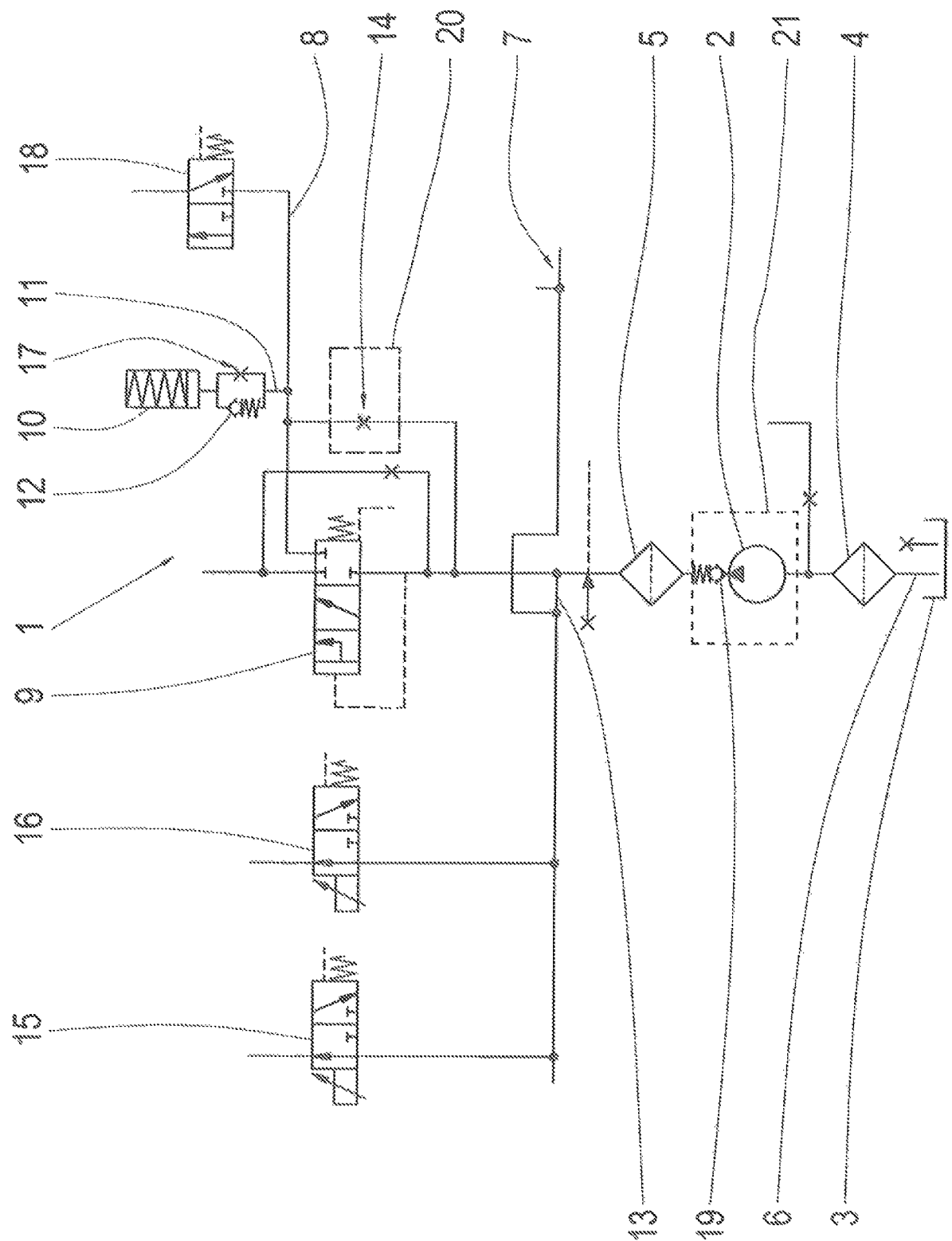

HYDRAULIC SYSTEM OF AN AUTOMATIC GEARBOX

This application is a National Stage completion of PCT/EP2016/067515 filed Jul. 22, 2016, which claims priority from German patent application serial no. 10 2015 215 930.2 filed Aug. 20, 2015.

FIELD OF THE INVENTION

The present invention concerns a hydraulic system of an automatic transmission. In addition, the invention concerns an automatic transmission comprising the hydraulic system according to the invention, and a method for operating the hydraulic system according to the invention.

BACKGROUND OF THE INVENTION

Automatic, powershifting transmissions for vehicles, called automatic transmissions for short, usually have a hydrodynamic torque converter as the starting element. Predominantly, these transmissions are designed as range-change transmissions, which comprise a plurality of planetary gearsets for obtaining a number of gears or gear steps which are usually engaged by means of hydraulic shifting elements, for example disk clutches or disk brakes.

To operate correctly a transmission requires an effective oil supply system for lubrication and cooling, and particular filling quantities and oil pressures for shifting the hydraulic components. For that purpose, as a rule a hydraulic pump is provided that is coupled to a transmission input shaft and driven by an internal combustion engine, and which supplies the requisite oil pressure by way of a regulated, valve-controlled hydraulic system.

To reduce the emission of pollutants, fuel consumption and noise levels, it is moreover desirable, particularly in urban traffic, to provide for so-termed start-stop operation in which, depending on the situation and possibilities, the combustion engine should be switched off when the vehicle is at rest, for example at road junctions controlled by traffic lights. However, in vehicles with converter automatic transmissions this is not straightforward.

Since the hydraulic pump is powered by the combustion engine, pressurized oil is only available while the engine is running. In contrast, when the combustion engine is switched off the hydraulic system loses pressure, whereupon the transmission control system usually disengages the current gear and shifts the transmission to a neutral position. Before any torque can be transmitted again a certain pressure must first build up again in the hydraulic system before the vehicle can start off. This results in a relatively long activation time before the gear is engaged after the engine has been started, and this makes it virtually impossible to operate a start-stop function with a high frequency of starting processes and the need, when the engine has been started, for example when the traffic lights change, to move off as quickly as possible since in practice frequent and long delays occur.

To enable start-stop operation, an additional pump powered by an electric motor could be used, which maintains the oil pressure when the internal combustion engine is switched off. However, besides additional costs this would take up more installation space and increase both weight and energy consumption, and would therefore have a counterproductive effect on the energy balance of the start-stop function, so that where possible it should be avoided.

DE 10 2007 003 924 A1 discloses a hydraulic system of an automatic transmission with a hydraulic pump that can be driven by an internal combustion engine for the pressurizing and cooling of hydraulic shifting elements of the automatic transmission. In order to delay a pressure drop in a main pressure circuit when the combustion engine is switched off, according to DE 10 2007 003 924 A1 it is proposed to connect the main pressure circuit by way of a connection line having a one-way valve, to a retarder reservoir. A disadvantage of this, however, is that an additional connection line and a one-way valve arranged in the connection line are needed in the hydraulic system.

SUMMARY OF THE INVENTION

Against that background the purpose of the present invention is to indicate a new type of hydraulic system of an automatic transmission which enables a shorter activation time of the automatic transmission after the engine has been started. Furthermore, an automatic transmission comprising the hydraulic system according to the invention and a method for operating the hydraulic system according to the invention are indicated.

The stated objective is achieved by the features specified in the independent claims. Advantageous further developments are the object of the subordinate claims and of the description given below.

The activation time to restore the ability of the transmission to transmit torque depends, among other things, on how quickly a main pressure builds up in the hydraulic system after starting the engine. Particularly during start-stop operation this activation time interval can be shortened by delaying the drop in pressure after switching off the combustion engine, so that until reactivation as high a pressure level as possible is maintained in the main pressure system in order to be able to act upon the shifting elements quickly with the necessary pressure or, to be precise, to reduce the push-back travel of the hydraulic pistons of the shifting elements from their shifting positions.

According to the present invention, a hydraulic system of an automatic transmission of a motor vehicle is proposed, which comprises a hydraulic pump powered by a drive engine for supplying pressure to the hydraulic system and a hydraulic reservoir by means of which, when the drive engine is at rest, a pressure drop in a main pressure circuit of the hydraulic system can at least be delayed.

To achieve the stated objective, the invention envisions that the hydraulic reservoir is connected to the main pressure circuit of the hydraulic system by way of an orifice or a throttle.

Since the hydraulic reservoir is connected to the main pressure via the orifice or throttle, the hydraulic reservoir is in permanent flow connection with the main pressure circuit. In that way, on the one hand the main pressure circuit can be supplied with oil from the hydraulic reservoir when the pressure in the main pressure circuit drops due to leakage taking place while the hydraulic pump is inactive. On the other hand, after the engine has been started, pressure surges occurring in the hydraulic system as the pressure builds up can be damped with the help of the hydraulic reservoir, provided that the hydraulic reservoir is not completely full.

In vehicles or transmissions with a hydraulic system that already has a hydraulic reservoir, the hydraulic reservoir is preferably connected to the main pressure circuit via the orifice or throttle. In that way the invention can be implemented particularly simply and inexpensively.

In such a hydraulic system, besides the main pressure circuit or primary pressure circuit which essentially supplies the shifting elements, there is an auxiliary or secondary pressure circuit, with which are associated for example a hydrodynamic retarder and a retarder reservoir. Thus, the hydraulic reservoir associated with the auxiliary or secondary pressure circuit is advantageously designed as the retarder reservoir of the hydrodynamic retarder belonging to the automatic transmission.

In addition to supplying pressure, the hydraulic pump can also serve for supplying cooling oil to the automatic transmission, in particular supplying cooling oil to shifting elements of the automatic transmission. The drive engine can for example be an internal combustion engine or an electric machine.

For the hydraulic supply of the hydraulic system and the automatic transmission it is provided that the hydraulic pump delivers oil by way of a suction line from an oil sump into an oil supply flange designed as a duct plate. The oil supply flange has corresponding ducts and, together with an intermediate plate which has a plurality of openings and is arranged between the oil supply flange and a valve housing of the hydraulic system, forms corresponding oil ducts for supplying the main and auxiliary pressure circuits of the hydraulic system. In a first embodiment of the invention it is now provided that the orifice present between the hydraulic reservoir and the main pressure circuit is in the form of an opening in the intermediate plate arranged between the oil supply flange and the valve housing. The opening in the intermediate plate can for example be made as a bore or produced by stamping. In that way the invention can be implemented particularly simply and inexpensively, since in the intermediate plate arranged between the oil supply flange and the valve housing only one additional opening has to be formed. No additional components or lines are needed.

If the main pressure in the main pressure circuit drops below the pressure in the auxiliary or secondary pressure circuit, then by way of the orifice formed in the intermediate plate oil from the hydraulic reservoir arranged in the auxiliary pressure circuit is delivered to the main pressure circuit until the hydraulic reservoir is empty or until the pressure in the main pressure circuit again reaches or exceeds the pressure level in the auxiliary pressure circuit.

In a second embodiment of the invention it is provided that the orifice is integrated into a main pressure valve. In this case the main pressure valve is arranged between the main pressure circuit, by which the shifting elements of the automatic transmission are supplied, and the auxiliary pressure circuit, in which the hydraulic reservoir is arranged. According to this second embodiment it is now provided that the valve housing or the valve piston of the main pressure valve is designed such that in an actuated position of the main pressure valve in which the main pressure valve cuts off the main pressure circuit from the auxiliary pressure circuit, besides a structurally determined gap leakage of the main pressure valve there is a flow connection between the main pressure circuit and the auxiliary pressure circuit. The orifice can for example be in the form of an aperture or edge in the valve housing or the valve piston. The main pressure valve is for example a sliding piston valve. If the pressure in the main pressure circuit drops below the pressure in the auxiliary pressure circuit, then by way of the orifice formed in the main pressure valve, oil is delivered from the hydraulic reservoir arranged in the auxiliary pressure circuit into the main pressure circuit until either the hydraulic reservoir is empty, or the main pressure has again reached or exceeded the pressure level in the auxiliary pressure circuit.

In a third embodiment of the invention it is provided that the orifice or throttle is arranged between the hydraulic reservoir and the main pressure circuit in a connection line by which the hydraulic reservoir is connected to the main pressure circuit. In a fourth embodiment of the invention it is provided that the throttle function is carried out by a connection line with a small cross-section arranged between the hydraulic reservoir and the main pressure circuit, so that the connection line itself is the throttle. In both of the above embodiments, oil is delivered into the main pressure circuit when the main pressure drops below the pressure in the auxiliary pressure circuit until either the hydraulic reservoir is empty, or the main pressure has again reached or exceeded the pressure level in the auxiliary pressure circuit.

By virtue of the embodiments described above the activation time of an automatic transmission after the engine has been started is made shorter, since the main pressure circuit is topped up with a pressure medium from the auxiliary pressure circuit if the main pressure in the main pressure circuit drops below the pressure in the auxiliary pressure circuit. Since the hydraulic reservoir is always in flow connection with the main pressure circuit via the orifice or throttle, a further advantage is that after the engine has been started, as the pressure in the hydraulic system builds up any pressure surges occurring are damped with the help of the hydraulic reservoir. The hydraulic reservoir can serve as a damper for pressure surges that occur, until it has been filled completely or has come up against its mechanical end-stop.

In an advantageous embodiment of the invention, to further shorted the activation time of the automatic transmission after the engine has been started it is now provided that between the hydraulic pump and a connection line of the main pressure circuit for supplying the shifting elements of the automatic transmission there is arranged a valve, which when the drive engine is switched off at least reduces any leakage taking place via the static hydraulic pump, but when the hydraulic pump is rotating, the valve has an only negligible effect on the volume flow in the direction of the main pressure circuit. It is particularly preferable to integrate the valve in the housing of the hydraulic pump. The valve can be a seat valve since in the closed condition seat valves are very leakproof. For example, the valve can be a one-way valve. Thus, by means of the valve arranged between the hydraulic pump and the connection line of the main pressure circuit for supplying the shifting elements of the automatic transmission, a pressure drop in the main pressure circuit of the hydraulic system when the hydraulic pump is not being driven can be reduced.

In a further embodiment of the invention it is provided that when the drive engine is at rest, leakage-causing elements in the main and/or auxiliary pressure circuits of the hydraulic system are switched to a low-leakage condition. This can reduce a pressure drop in the main or auxiliary circuit, which substantially extends the time in which a minimum activation level of the automatic transmission is possible.

Furthermore, the invention concerns an automatic transmission which, besides the above-described hydraulic system according to the invention, comprises a hydrodynamic starting element having a pump wheel on the drive input side and a turbine wheel on the drive output side for the transmission of torque in the drive-train of a motor vehicle when the motor vehicle is started. The hydrodynamic starting element forms a driving connection between the drive engine and the automatic transmission, and can for example be in the form of a hydrodynamic torque converter or a hydrodynamic clutch. The hydraulic pump driven by the drive engine is preferably coupled to the input shaft of the automatic transmission.

The method according to the invention for operating the above-described hydraulic system envisions that when the drive engine is inactive, shifting elements of a starting gear are acted upon by pressure for as long as the pressure from the hydraulic reservoir is sufficient to compensate for the leakage taking place in the main pressure circuit. Thus for example, the valves associated with the shifting elements of a starting gear, such as proportional magnetic valves or pressure regulators, are electrically energized so that the shifting elements of the starting gear are in flow connection with the main pressure of the hydraulic system. If the leakage taking place in the main pressure circuit can be compensated for by oil from the auxiliary pressure circuit until the engine has been started, then the shifting elements of a starting gear are already closed and a starting process of the motor vehicle can take place immediately.

When the retarder reservoir is used as the hydraulic reservoir, the function of the retarder is not compromised by what has been described above, since its filling with oil is only called for during brake operation. In this way, according to the present invention, after the drive engine has been switched off the pressure in the main pressure circuit can be maintained for a longer time, advantageously combined with the maintenance of a shift position of the hydraulic pistons of the disk clutches or disk brakes when the gear step is engaged. Accordingly, the subsequent activation time in start-stop operation can at least be made shorter.

BRIEF DESCRIPTION OF THE DRAWINGS

Further advantages, features and details emerge from the following description of an embodiment of the invention, in which an example design is described with reference to the drawing. The references of the claims to the drawing by using indexes is not intended to limit the protective scope of the claims. The sole FIGURE shows a section of a simplified diagram of a hydraulic system according to the invention.

DETAILED DESCRIPTION OF THE PREFERRED EMBODIMENTS

The sole FIGURE shows a section of a hydraulic system 1 of an automatic transmission for a motor vehicle, for example a 6-gear transmission of planetary design, with hydraulic shifting elements in the form of disk clutches or disk brakes for the shifting of gear steps, with a hydrodynamic torque converter that can be bridged as the starting element, with a hydrodynamic primary retarder advantageously in the form of an intarder for assisting the brakes of the motor vehicle, and with an electronic transmission control unit close to the transmission for controlling the shifts of the transmission by way of the hydraulic system 1. In a known manner the torque converter comprises an engine-driven pump wheel and a turbine wheel that drives the transmission, as well as a guide wheel on a freewheel for converting the torque. The hydraulic system 1 can for example be regulated by directly controlled valves.

Such a transmission and its function is known as such and will therefore not be illustrated and explained in more detail here. Thus, the description below is limited to that part of the hydraulic system 1 which relates to the invention.

To supply the transmission with pressure oil, an advantageously transmission-internal hydraulic pump or oil pump 2 is provided, which is coupled to a transmission input shaft (not shown here) and can be driven by an internal combustion engine (not shown). The oil pump 2 is fed from an oil sump 3 via a suction line 6, and to ensure that no impurities can make their way into the hydraulic system 1 an inlet strainer 4 is connected upstream from the oil pump 2 and an oil filter 5 is connected downstream from it. From the suction line 6, above all a main pressure circuit 7 and an auxiliary pressure circuit designed as a retarder pressure circuit 8 can be supplied with pressure oil. A main pressure valve 9 is connected to the main pressure circuit 7 and the retarder pressure circuit 8. Switching or regulating valves 15, 16 associated with shifting elements of the automatic transmission are connected to the main pressure circuit 7 and a switching or regulating valve 18 is connected to the auxiliary pressure circuit 8 of the hydraulic system 1. Other oil lines or branchings indicated in the FIGURE lead to bypass, switching and pressure-regulating valves, which are not explained and illustrated further and which can be controlled and/or regulated essentially in functional connection with the main pressure valve 9.

The retarder pressure circuit 8 comprises a retarder reservoir 10 designed as a pressure reservoir, which is connected to the hydraulic system 1 by a pressure line 11. The retarder reservoir 10 can be designed as a passive, spring-operated reservoir or it can be actuated by means of external pneumatic or hydraulic means. When the retarder is actuated, the volume of the retarder reservoir is emptied out by way of a one-way valve 12 and a retarder regulating valve 18 into a retarder chamber of the retarder and this ensures a rapid response time of the retarder. A feeder opening 17 is provided for refilling the retarder reservoir.

According to the invention, in this case an orifice 14 is arranged between the auxiliary pressure circuit 8 and the main pressure circuit 7 of the hydraulic system. The orifice 14 is indicated only schematically here, and it enables a direct connection between the retarder reservoir 10 and the main pressure circuit 7 of the hydraulic system 1. As described earlier this orifice 14 can for example be in the form of an aperture in an intermediate plate 20 arranged between an oil supply flange and a valve housing of the hydraulic system 1, or it can be arranged in a connection line between the retarder reservoir 10 and the main pressure circuit 7.

Since during start-stop operation, after the internal combustion engine has been switched off the hydraulic pump 2 is no longer being driven, the pressure in the main pressure circuit 7 drops because of leakage taking place, to below the pressure in the auxiliary pressure circuit 8. Thereupon, with its oil volume the retarder reservoir 10 feeds the main pressure circuit 7 by way of the pressure line 11 and the orifice 14, so that if the combustion engine is switched off and a gear is engaged, pressure oil is still available to act upon the actuating pistons of the disk clutches and/or disk brakes of the automatic transmission, whereby these shifting elements can be held at least approximately in their existing positions until the retarder reservoir 10 has been emptied. For example, the switching or regulating valves 15, 16 associated with the shifting elements of a starting gear are electrically energized so that the shifting elements of the starting gear are in flow connection with the main pressure of the hydraulic system 1.

When the engine is restarted, the hydraulic pump 2 starts pumping and the main pressure builds up. Pressure surges occurring while the pressure is building up can be damped with the help of the retarder reservoir 10 provided that the retarder reservoir 10 is not completely full. However, the actual filling of the retarder reservoir 10 only takes place when the main pressure valve 9 is displaced to its middle or left-hand shifting position, in which the hydraulic pump 2 is connected to the auxiliary pressure circuit 8 in the filling direction.

Between the hydraulic pump 2 and a connection line 13 of the main pressure circuit 7 for supplying the shifting elements of the automatic transmission, there is arranged for example a one-way valve 19 which, when the drive engine is switched off, at least reduces leakage via the static hydraulic pump 2. The valve 19 can be integrated in the housing 21 of the hydraulic pump 2.

During start-stop operation the temporary upkeep of the pressure in the main pressure circuit 7 shortens an activation time needed in order to build up the necessary hydraulic pressure required for acting upon and cooling shifting elements before the starting gear selected can transmit torque.

INDEXES

1 Hydraulic system
2 Hydraulic pump
3 Oil sump
4 Inlet strainer
Filter
6 Suction line
7 Main pressure circuit
8 Retarder pressure circuit
9 Main pressure valve
Hydraulic reservoir, retarder reservoir
11 Pressure line
12 One-way valve
13 Connection line
14 Orifice, throttle
Switching or regulating valve
16 Switching or regulating valve
17 Feeder opening
18 Switching or regulating valve
19 One-way valve

The invention claimed is:

1. A hydraulic system of an automatic transmission of a motor vehicle, comprising:
   a hydraulic pump powered by a drive engine for supplying pressure to the hydraulic system,
   a hydraulic reservoir by which, when the drive engine is at rest, for at least delaying a pressure drop in a main pressure circuit of the hydraulic system,
   the hydraulic reservoir being connected to the main pressure circuit by way of either an orifice or a throttle,
   wherein a valve is arranged between the hydraulic pump and a connection line of the main pressure circuit for supplying shifting elements of the automatic transmission,
   the valve at least reduces leakage through the static hydraulic pump when the drive engine is switched off, and
   the valve is integrated in a housing of the hydraulic pump.

2. The hydraulic system according to claim 1, wherein the orifice is in a form of either an aperture or a bore in an intermediate plate, which is arranged between an oil supply flange and a valve housing.

3. The hydraulic system according to claim 1, wherein the orifice is integrated in a main pressure valve of the hydraulic system.

4. The hydraulic system according to claim 1, wherein the orifice is arranged in a connection line by which the main pressure circuit is connected to the hydraulic reservoir.

5. The hydraulic system according to claim 1, wherein the throttle is arranged either in or in a form of a connection line by which the main pressure circuit is connected to the hydraulic reservoir.

6. The hydraulic system according to claim 1, wherein the hydraulic reservoir is a retarder reservoir of a hydrodynamic retarder which belongs to the automatic transmission.

7. The hydraulic system according to claim 1, wherein the valve is a one-way valve.

8. The hydraulic system according to claim 1, wherein, when the drive engine is at rest, leakage-causing elements in the hydraulic system are switched to a low-leakage condition.

9. An automatic transmission, of a motor vehicle, comprising:
   a hydraulic system having a hydraulic pump powered by a drive engine for supplying pressure to the hydraulic system,
   a hydraulic reservoir by which, when the drive engine is at rest, a pressure drop in a main pressure circuit of the hydraulic system is at least delayed,
   the hydraulic reservoir being connected to the main pressure circuit by way of either an orifice or a throttle;
   wherein a valve is arranged between the hydraulic pump and a connection line of the main pressure circuit for supplying shifting elements of the automatic transmission,
   the valve at least reduces leakage through the static hydraulic pump when the drive engine is switched off, and
   the valve is integrated in housing of the hydraulic pump.

10. A method of operating a hydraulic system and an automatic transmission of a motor vehicle, the hydraulic system having a hydraulic pump powered by a drive engine for supplying pressure to the hydraulic system, and a hydraulic reservoir by which, when the drive engine is at rest, a pressure drop in a main pressure circuit of the hydraulic system is at least delayed, the hydraulic reservoir is connected to the main pressure circuit by way of either an orifice or a throttle, the method comprising:
   arranging a valve between the hydraulic pump and a connection line of the main pressure circuit for supplying shifting elements of the automatic transmission,
   at least reducing leakage through the static hydraulic pump, via the valve, when the drive engine is switched off,
   integrating the valve in a housing of the hydraulic pump, and
   acting upon shifting elements of a starting gear, when the drive engine is at rest, by pressure provided from the hydraulic reservoir as long as the pressure provided from the hydraulic reservoir is sufficient to compensate for leakage occurring the main pressure circuit.

* * * * *